J. BALL.
Plow.

No. 81,730.

Patented Sept. 1, 1868.

Witnesses,
Cornelius Cox
Leopold Burch

Inventor;
John Ball
per Alexander & Mason
Atty

UNITED STATES PATENT OFFICE.

JOHN BALL, OF CANTON, OHIO.

IMPROVEMENT IN PLOWS.

Specification forming part of Letters Patent No. 81,730, dated September 1, 1868.

*To all whom it may concern:*

Be it known that I, JOHN BALL, of Canton, in the county of Stark and State of Ohio, have invented certain new and useful Improvements in Plows; and I do hereby declare that the following is a full, clear, and exact description thereof, reference being had to the accompanying drawings, and to the letters of reference marked thereon.

The nature of my invention consists in the construction and arrangement of a double point to a plow, extending the whole length of the landside, and which, by its peculiar construction, admits of it being fastened by a bolt nearer to the point on the landside than on any plows now in use; and, also, in attaching the handles to the beam or standard by means of a ratchet and bolt, so that either or both may be adjusted to suit the height of the operator.

In order to enable others skilled in the art to make and use my invention, I will now proceed to describe its construction and operation, referring to the annexed drawings, which form a part of this specification, and in which—

Figure 1:
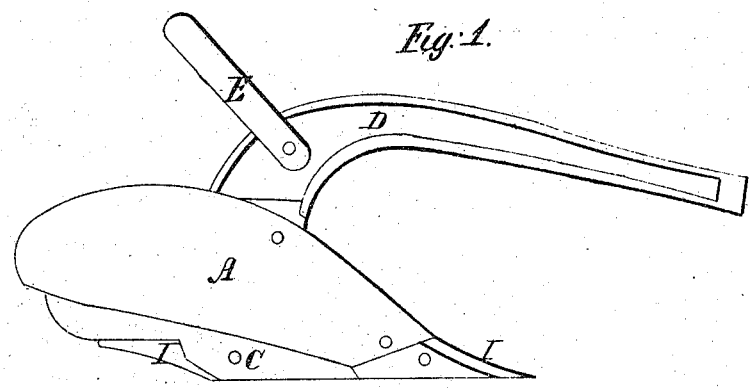
Figure 2:
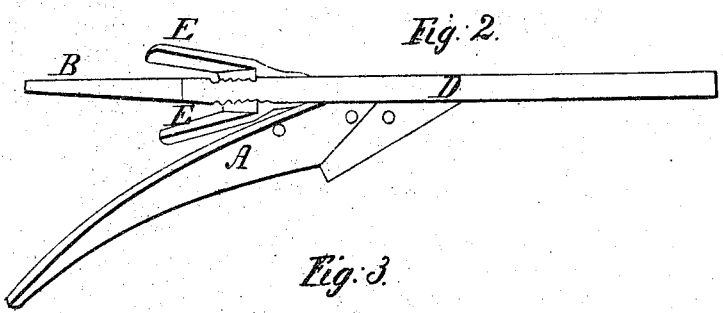
Figure 3:
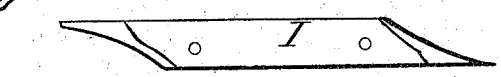
Figure 4:
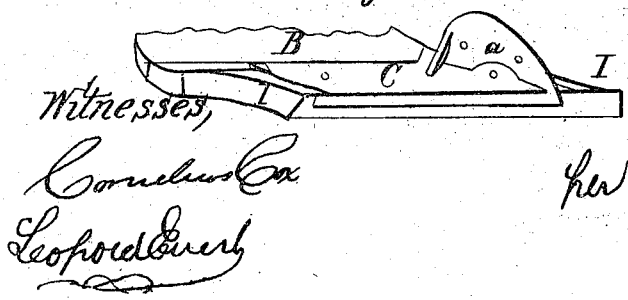

Figure 1 is a side view, Fig. 2, a plan view, and Fig. 3 a side view, of the reversible double point. Fig. 4 is a bottom view of the landside.

A represents the wing of a plow, secured in the most suitable manner to ears on the inner side of the landside B. This landside is provided on the inner side with a "fashion-piece," C, which is constructed with an ear, *a*, to which the wing A is also secured. This fashion-piece extends below the lower edge of the landside, and to it the point I is fastened, said point forming a part of the landside, being so constructed as to extend the whole length of the same, and has a point in each end, so that it can be turned, if desired. The shape of this double point is square at the front end, and beveled from the outside downward to the side of the wing, so as to correspond with the shape of the same. By the arrangement of the fashion-piece C and the point I, so constructed, a bolt can be placed nearer to the point on the landside than on any plows now in use, which enables the manufacturers to make a more secure fastening with a lighter point than if the bolt were farther back, and it can also be made much cheaper than any now in use.

D represents the beam, on which the handles E E are secured. The beam is corrugated on both sides, to fit into similar corrugations on the inner side of the handles, as shown in Fig. 2. A bolt or screw then passes through the handles and the beam, and by this arrangement one or both of the handles may be adjusted to suit the height of the operator.

It is often the case that a farmer has not the means to hire a man to plow, and by this arrangement a boy can attend to it.

Having thus fully described my invention, what I claim as new, and desire to secure by Letters Patent, is—

1. The double point I, when constructed as described, and operating substantially as and for the purposes herein set forth.

2. The corrugated beam D, in combination with the corrugated handles E E, when arranged so as to be adjustable, substantially as and for the purposes herein set forth.

In testimony that I claim the foregoing I have hereunto set my hand this 6th day of June, 1868.

JOHN BALL.

Witnesses:
W. W. CLARK,
HENRY FISHER.